US010935148B2

(12) United States Patent
Kiełczykowski et al.

(10) Patent No.: US 10,935,148 B2
(45) Date of Patent: Mar. 2, 2021

(54) CHECK VALVES (71) Applicant: Hamilton Sundstrand Corporation, Charlotte, NC (US)

(72) Inventors: Przemysław Kiełczykowski, Milicz (PL); Zbigniew Jaśkiewicz, Wrocław (PL)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/573,246

(22) Filed: Sep. 17, 2019

(65) Prior Publication Data
US 2020/0166146 A1 May 28, 2020

(30) Foreign Application Priority Data

Nov. 27, 2018 (EP) ..................... 18461636

(51) Int. Cl.
*F16K 15/03* (2006.01)
*F16K 1/22* (2006.01)

(52) U.S. Cl.
CPC ............ *F16K 15/035* (2013.01); *F16K 1/223* (2013.01)

(58) Field of Classification Search
CPC ...... F16K 15/035; F16K 15/038; F16K 1/223; Y10T 137/7839
See application file for complete search history.

(56) References Cited

U.S. PATENT DOCUMENTS

| 3,640,306 A | 2/1972 | Vogt |
| 4,326,555 A | 4/1982 | Thomson |
| 4,406,022 A * | 9/1983 | Roy ..................... A61F 2/2403 137/512 |
| 5,222,519 A * | 6/1993 | Sato ..................... F16K 15/035 137/512.1 |
| 5,674,125 A * | 10/1997 | Xia ..................... F16K 1/223 454/327 |

(Continued)

FOREIGN PATENT DOCUMENTS

| EP | 3106721 A1 | 12/2016 |
| EP | 3181965 A1 | 6/2017 |
| EP | 3284984 A1 | 2/2018 |

OTHER PUBLICATIONS

Extended European Search Report for International Application No. 18461636.5 dated May 23, 2019, 6 pages.

*Primary Examiner* — Kevin F Murphy
(74) *Attorney, Agent, or Firm* — Cantor Colburn LLP (57) ABSTRACT A check valve comprises an annular housing defining a generally circular opening. A plurality of radially extending arms extend across the circular opening from the centre of the valve housing to respective nodes at the periphery of the valve housing. A plurality of cross arms extend between circumferentially adjacent nodes, thereby dividing the circular opening into a plurality of primary, generally triangular radially inner openings and a plurality of secondary, generally segment shaped radially outer openings. A plurality of primary, generally triangular flapper elements close the primary openings and a plurality of secondary, generally segment shaped flapper elements close the secondary openings. Respective mounting posts are arranged at a respective node and a respective hinge pin is mounted between respective circumferentially adjacent mounting posts.

18 Claims, 8 Drawing Sheets

(56) References Cited

U.S. PATENT DOCUMENTS

| | | | |
|---|---|---|---|
| 6,796,327 B2 * | 9/2004 | Bodnar | F16K 15/035 |
| | | | 137/512.1 |
| 7,025,086 B2 * | 4/2006 | Maeda | F04D 25/14 |
| | | | 137/512.1 |
| 8,998,171 B2 | 4/2015 | Bormioli | |
| 9,341,269 B2 | 5/2016 | Bormioli | |
| 2007/0131285 A1 * | 6/2007 | Zika-Beyerlein | F02M 26/61 |
| | | | 137/512.1 |
| 2017/0204981 A1 * | 7/2017 | Olejak | F16K 27/0209 |
| 2018/0087680 A1 * | 3/2018 | Wilhelm | A62B 18/10 |

* cited by examiner

CHECK VALVES

FOREIGN PRIORITY

This application claims priority to European Patent Application No. 18461636.5 filed Nov. 27, 2018, the entire contents of which is incorporated herein by reference.

TECHNICAL FIELD

The present disclosure relates to check valves and flappers therefor.

BACKGROUND

Check valves are valves that allow fluid flow in one direction therethrough and prevent flow in the opposite direction. They are widely used in a range of applications, for example in air conditioning systems, for example in aircraft air conditioning systems.

Check valves commonly include a pair of valve elements or flappers located at an opening in a valve housing. The flappers are supported for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

Typically the flappers are supported on a common hinge pin. However, should damage occur to the hinge pin or a flapper, the operation of the whole valve may be compromised.

SUMMARY

The present disclosure provides a check valve comprising an annular housing defining a generally circular opening. A plurality of radially extending arms extend across the circular opening from the centre of the valve housing to respective nodes at the periphery of the valve housing. A plurality of cross arms extend between circumferentially adjacent nodes, thereby dividing the circular opening into a plurality of primary, generally triangular radially inner openings and a plurality of secondary, generally segment shaped radially outer openings. The valve further comprises a plurality of primary, generally triangular flapper elements for closing the primary openings and a plurality of secondary, generally segment shaped flapper elements for closing the secondary openings. The valve also comprises a plurality of mounting posts, a respective mounting post being arranged at a respective node.

A hinge pin is mounted between each pair of circumferentially adjacent mounting posts. A primary flapper element and a secondary flapper element are hingedly mounted to each hinge pin for pivoting between a closed position in which they close their respective primary and secondary openings and an open position in which they permit flow through their respective primary and secondary openings.

The check valve may comprise four primary and secondary openings and four primary and secondary flapper elements.

The primary flapper elements may each be symmetrical about a radial centreline thereof.

The base end of a primary flapper element may comprise a pair of mounting lugs for receiving an associated hinge pin.

The primary flapper element mounting lugs may be arranged at opposed edges of the primary flapper element.

The secondary flapper elements may each be symmetrical about a centreline (A) of each secondary flapper element.

The base end of a secondary flapper element may comprise a pair of mounting lugs for receiving an associated hinge pin.

The secondary flapper element mounting lugs may be arranged displaced inwardly from opposed sides of the secondary flapper element.

The check valve may further comprise a plurality of stops for stopping the primary and secondary flapper elements in their open positions.

The stops may comprise respective stop bars (extending between respective circumferentially adjacent mounting posts.

The stop bars may be arranged vertically above the hinge pins.

The mounting posts may be separate from the valve housing and mounted thereto by one or more fasteners.

The mounting posts may be formed with bores for receiving the respective hinge pins.

The mounting posts may be formed with bores for receiving the respective stop bars.

The bores may be blind bores.

BRIEF DESCRIPTION OF DRAWINGS

An embodiment of the disclosure will now be described by way of example only with reference to the accompanying drawings in which.

DETAILED DESCRIPTION

Figure 1:
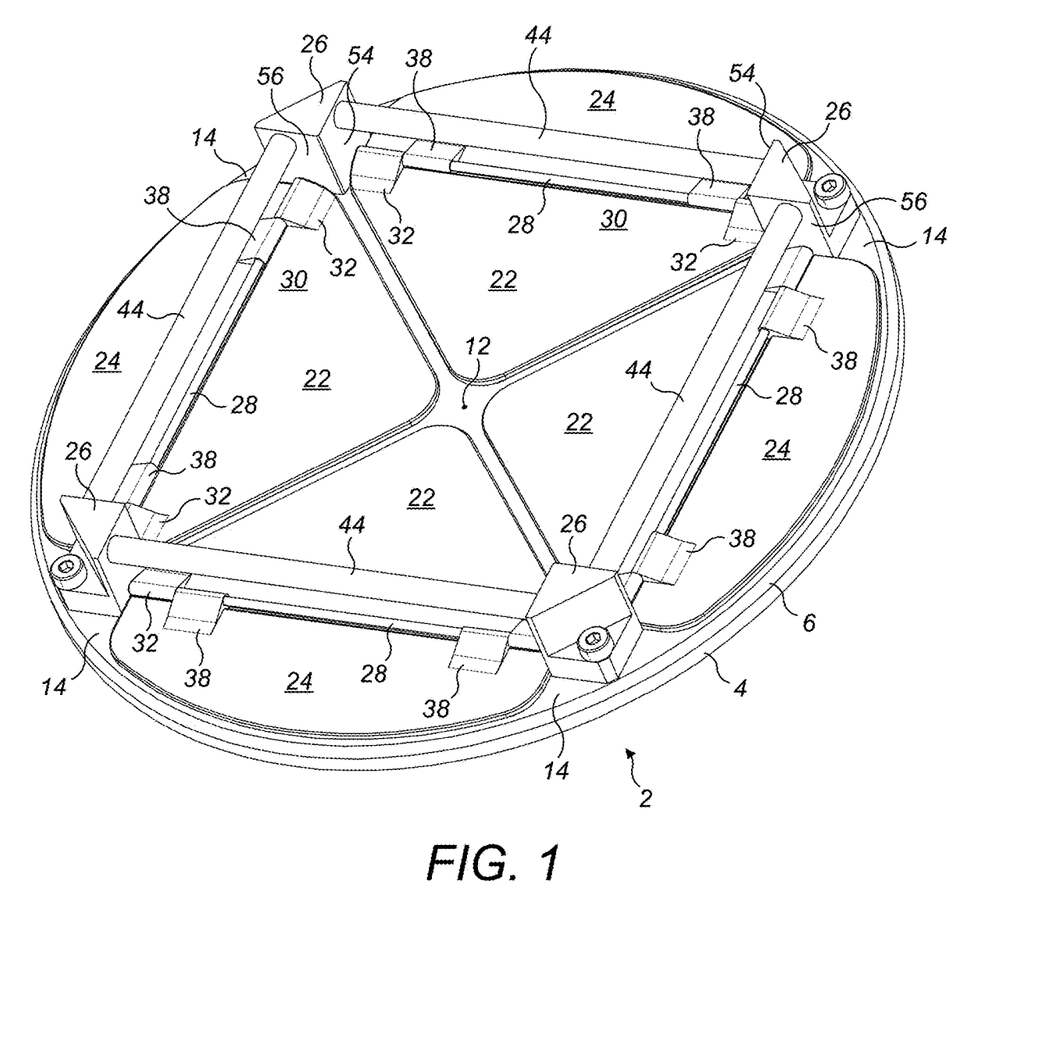
FIG. 1 shows a perspective view of a check valve in accordance with the disclosure in a closed configuration.
Figure 2:
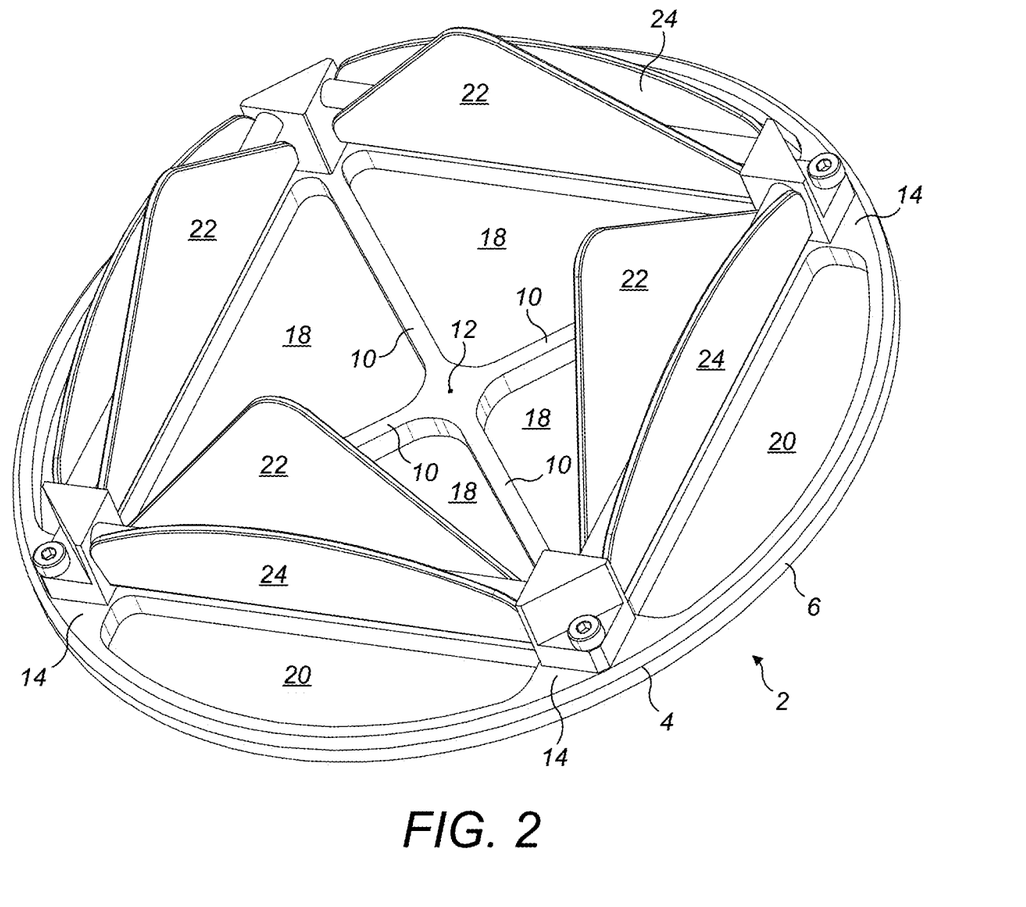
FIG. 2 shows the check valve of FIG. 1 in an open configuration.
Figure 3:
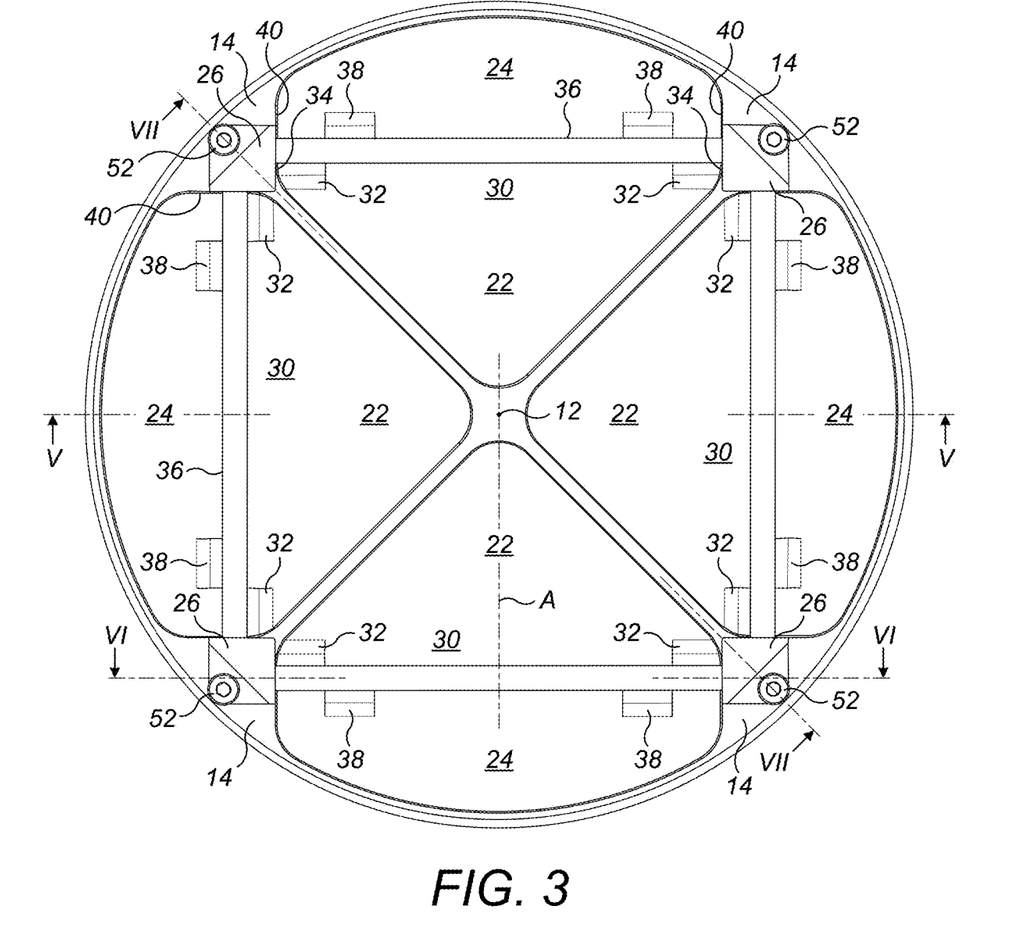
FIG. 3 shows a plan view of the check valve of FIG. 1

Referring to FIGS. 1 to 3, a check valve 2 in accordance with the disclosure is illustrated.

The check valve 2 comprises a valve housing 4. The valve housing 4 is generally annular and may be planar as illustrated. The valve housing 4 may be mounted in a pipe, duct or the like by means of its outer periphery 6.

Figure 4:
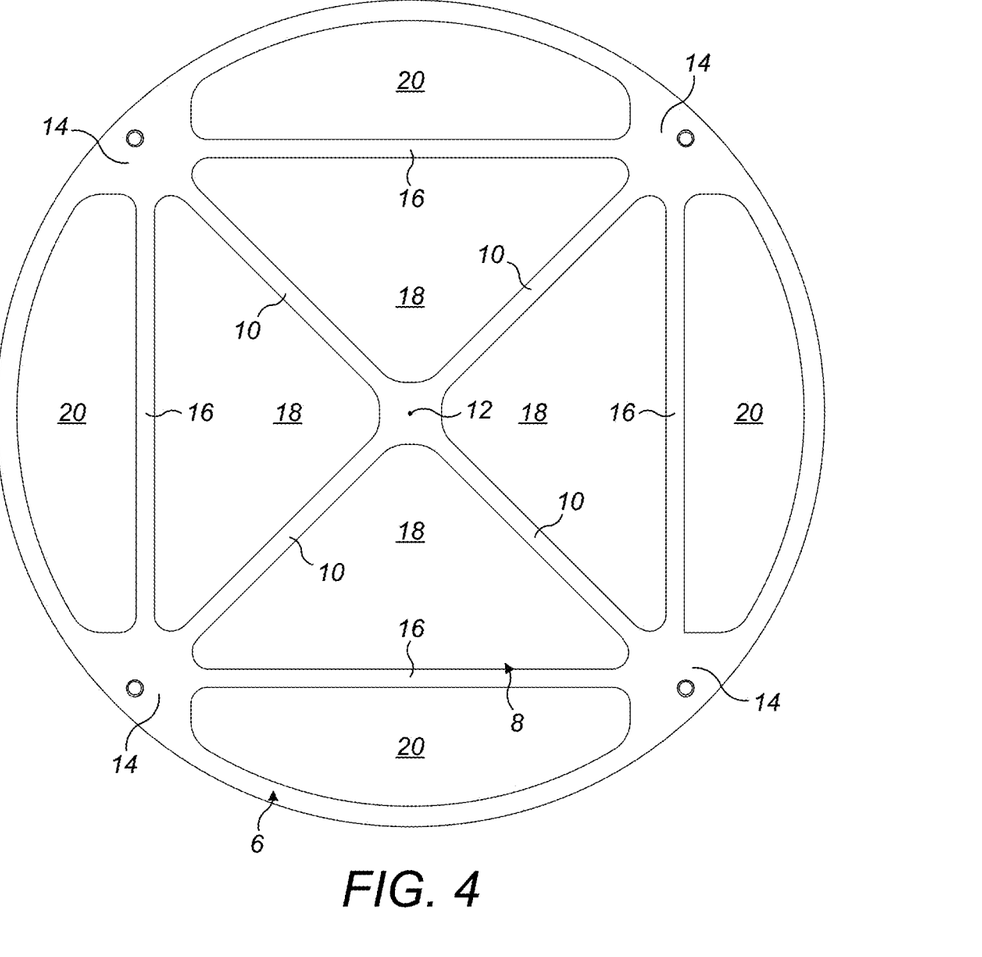
FIG. 4 shows a plan view of the housing of the check valve of FIG. 1.
Figure 5:
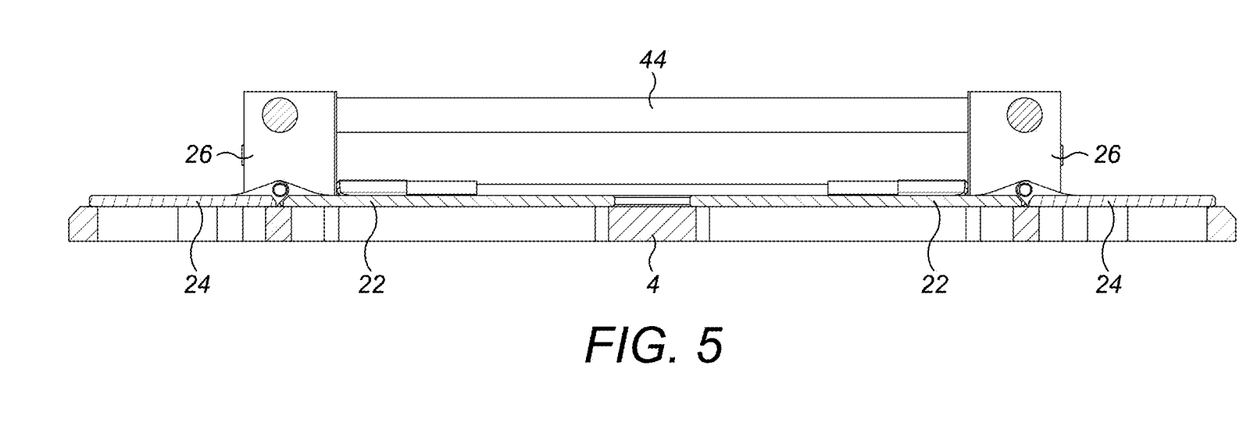
FIG. 5 shows a sectional view of the check valve of FIG. 1 taken along line V-V of FIG. 3.

The annular valve housing 4 defines a generally circular opening 8, best seen in FIG. 4. However, this generally circular opening 8 is divided into a number of smaller openings as will be described further below.

The valve housing 4 comprises a plurality of radially extending arms 10. Each arm 10 extends from a central node 12 arranged at the centre of the valve housing 4 and opening 8 to a respective node 14 at the periphery 6 of the valve housing 4.

The valve housing 4 further comprises a plurality of cross arms 16. Each cross arm 16 extends along a respective chord defined between circumferentially adjacent nodes 14.

This array of radially extending arms 10 and cross arms 16 divides the generally circular opening 8 into a plurality of primary, generally triangular radially inner openings 18 and a plurality of secondary, generally segment shaped radially outer openings 20. In fact, in this embodiment, the generally segment shaped openings 20 are D-shaped, having squared-off sides 40.

The valve 2 further comprises a plurality of primary, generally triangular flapper elements 22 for closing the primary, generally triangular radially inner openings 20 and a plurality of secondary, generally segment shaped flapper elements 24 for closing the secondary generally segment shaped radially outer openings 20.

The valve 2 further comprises a plurality of mounting posts 26. A respective mounting post 26 is arranged at each peripheral node 14. As will be described in further detail below, a respective hinge pin 28 extends between two circumferentially adjacent mounting posts 26. A primary flapper element 22 and a secondary flapper element 24 are each hingedly mounted to each hinge pin 28 for pivoting between a closed position in which they close their respective primary or secondary opening 18, 20 and an open position in which they permit flow through their respective primary and secondary opening 18, 20.

It will be seen that in accordance with the disclosure, rather than having just two generally semi-circular openings which are closed by generally two semi-circular flapper elements, the valve opening is divided into a larger number of smaller openings 18, 20, each of which is closed by a respective flapper element 22, 24. As discussed above, in a traditional check valve, should the hinge pin fail, then the entire function of the check valve may be lost. In a valve in accordance with the disclosure, should a hinge pin 28 fail, then only the flapper elements 22, 24 openings associated with that hinge pin 28 may fail to operate and the other flapper elements 22, 24 may still continue to function normally. This means that the valve 2 may still continue to operate to some degree.

In the disclosed embodiment, the check valve 2 comprises four primary and secondary openings 18, 20 and four primary and secondary flapper elements 22, 24. However, this is just exemplary, and there may be fewer or more openings 18, 20 and flapper elements 22, 24. For example, there may be just three sets of openings 18, 20 and flapper elements 22, 24, or five or more sets of openings 18, 20 and flapper elements 2, 24. However, it is thought that four sets of openings 18, 20 and flapper elements 22, 24 provide an optimal balance between the open area of the opening 6 and mounting requirements for the flapper elements 22, 24.

Turning now to further detail of the valve construction, the primary flapper elements 22 are, in this embodiment, each symmetrical about a radial centreline A thereof. This provides a balanced load on the associated hinge pin 28.

As shown, the base end 30 of each primary flapper 22 comprises a pair of mounting lugs 32 for receiving the associated hinge pin 28. The mounting lugs 32 are symmetrically arranged in this embodiment, but in other embodiments they need not be so arranged.

The primary flapper element mounting lugs 32 are arranged at opposed edges 34 of the primary flapper element 22 so that they are arranged closely adjacent to the adjacent mounting post 26. The mounting lugs are typically formed integrally with the primary flapper elements 22.

The secondary flapper elements 24 are, in this embodiment, also symmetrical about a centreline A of each secondary flapper element 24. Again this provides a balanced load on the associated hinge pin 28.

Similarly to the primary flapper elements 22 the base end 36 of each secondary flapper 24 comprises a pair of mounting lugs 38 for receiving an associated hinge pin 28. In this embodiment, the secondary flapper element mounting lugs 38 are arranged displaced inwardly from opposed sides 40 of the secondary flapper element 24 and are nested within the primary flapper mounting lugs 32. Of course other arrangements of the mounting lugs 32, 38 may be employed. For example, each flapper element 22, 24 may have more than two mounting lugs 32, 38 and the relative disposition of the mounting lugs 32, 38 may differ from that shown. Thus, for example, the secondary flapper element mounting lugs 38 may be arranged outwardly of the primary flapper element mounting lugs 32 in other embodiments.

It will be seen that the check valve 2 further comprises a plurality of stops 44 for stopping the primary and secondary flapper elements 22, 24 in their open positions. In the disclosed embodiment, the stops 44 are formed as respective stop bars 44 which extend between respective circumferentially adjacent mounting posts 26. In the disclosed embodiment, the stop bars 44 are arranged vertically above the hinge pins 28.

Figure 8:
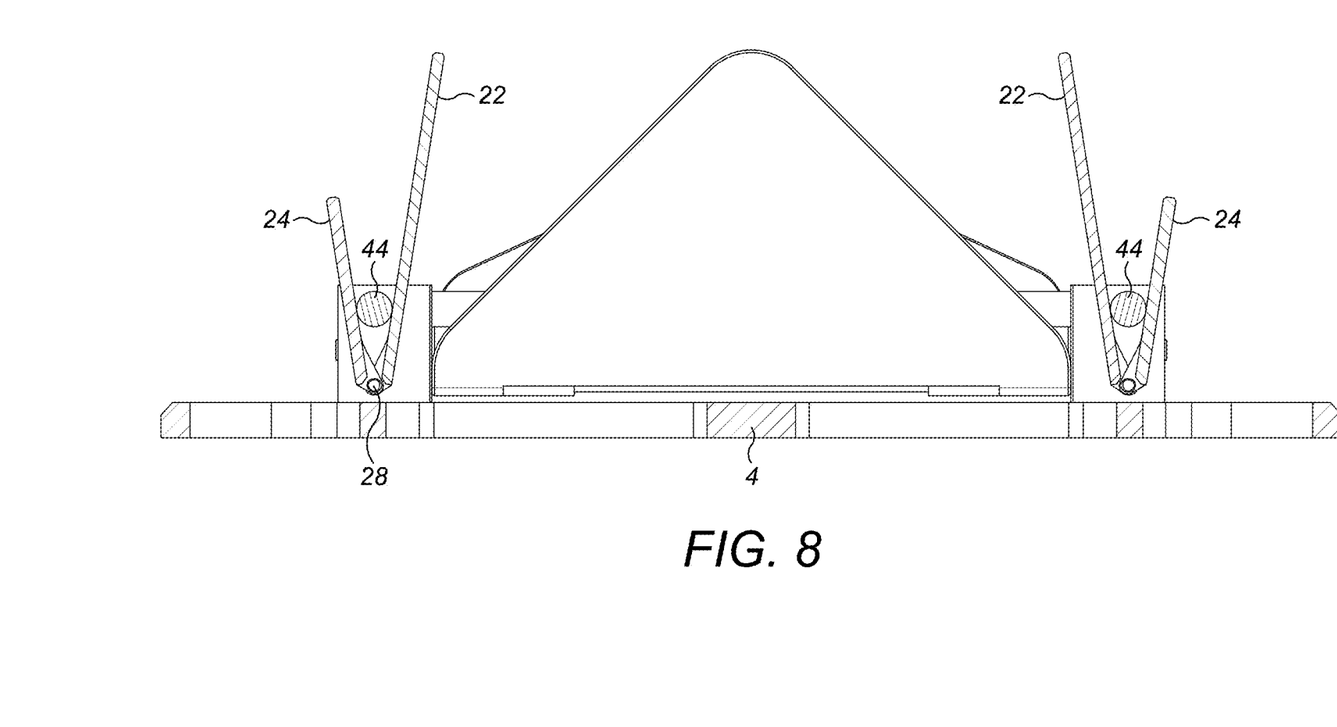
FIG. 8 shows a sectional view corresponding to that of FIG. 5, but with the valve in an open configuration.

As can be seen in FIGS. 2 and 8, for example, the stop bars 44 limit the pivotal movement of both the primary and secondary flapper elements 22, 24. The illustrated positioning of the stop bar 44 provides a symmetrical opening of the primary and secondary flapper elements 22, 24. The range of angular motion of each flapper element 22, 24 may be varied by modifying the vertical position of the stop bar 44 relative to the hinge pin 28 and/or by increasing or decreasing the diameter of the stop bar 44. In some embodiments, the angular motion may be up to 90° by suitable dimensioning and positioning of the stop bar 44. Generally, however, in the open position, the respective flapper element 22, 24 should be at an angle less than 90°, for example in the range of 80° to 85° in order to ensure proper closure under reverse flow.

Figure 6:
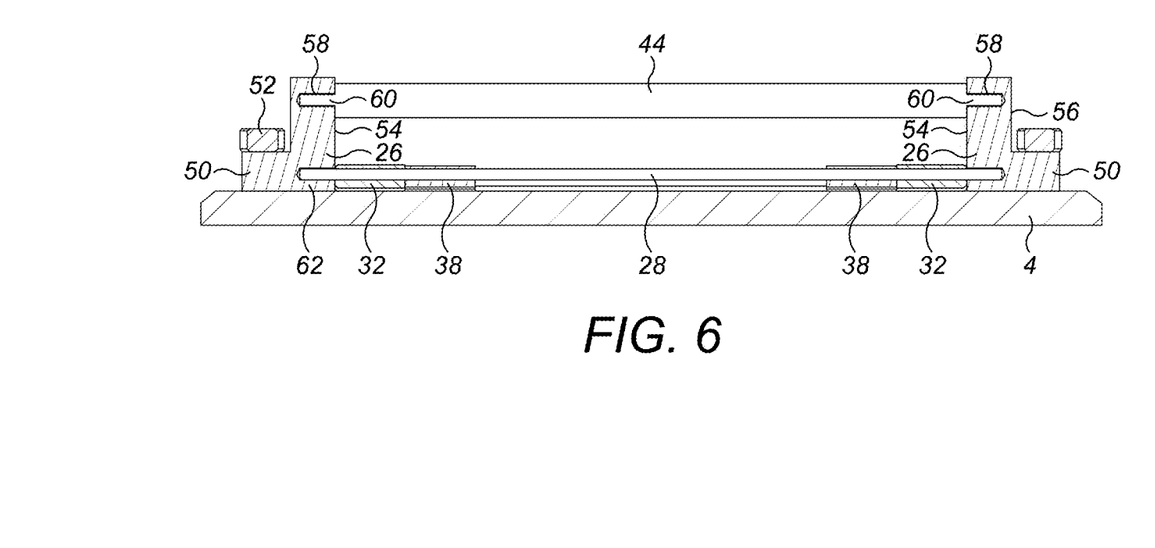
FIG. 6 shows a sectional view of the check valve of FIG. 1 taken along line VI-VI of FIG. 3.
Figure 7:
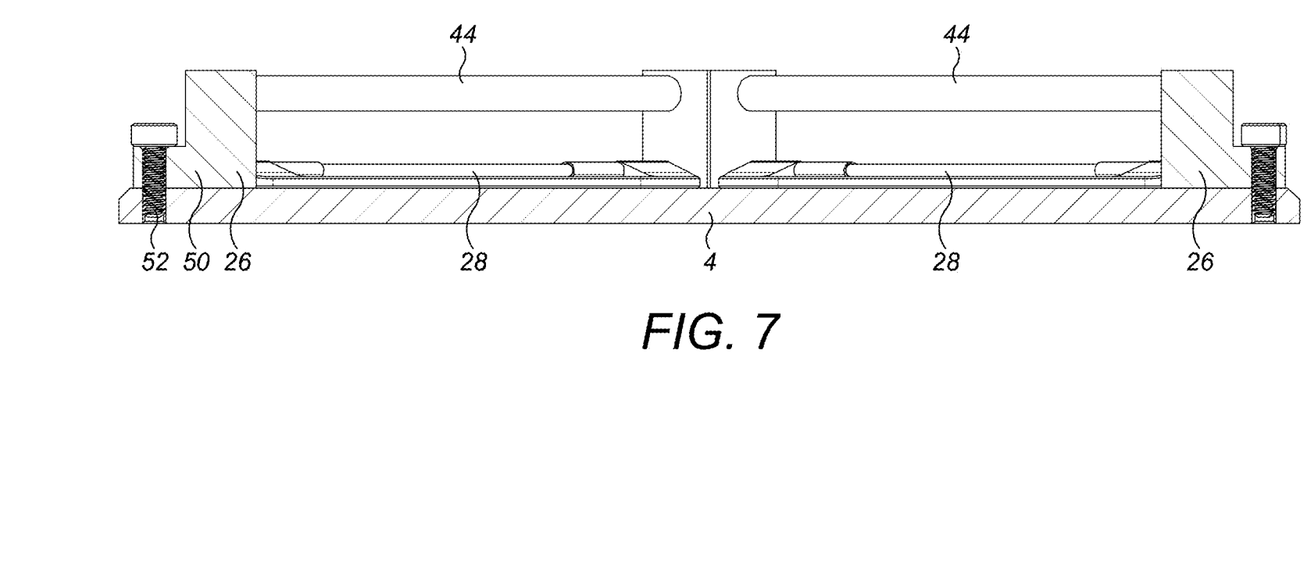
FIG. 7 shows a sectional view of the check valve of FIG. 1 taken along line VII-VII of FIG. 3.

As can be seen from FIGS. 1, 6 and 7, the mounting posts 26 comprise a base portion 50 which is received on the associated peripheral node 14 and attached thereto by means of one or more fasteners 52. Each mounting post 26 further has faces 54, 56 which receive a hinge pin 28 and stop bar 44. In the embodiment illustrated, the faces 54, 56 are at 90° to one another but in other embodiments with different numbers of flappers, the angle will be different.

As can best be seen in FIG. 6, each face 54, 56 comprises a first blind bore 58 for receiving a mounting portion 60 of the stop bar 44 and a second blind bore 62 for receiving an end of the hinge pin 28. This is merely an exemplary arrangement and other mounting arrangements can be envisaged. For example, the respective mounting posts 26 may be provided with through bores which receive the respective ends of the stop bars 44 and hinge pins 28, the stop bars 44 and hinge pins 28 being suitably secured in the bores. Such an arrangement may mean that the mounting posts 26 may be formed as an integral part of the valve housing 4 rather than a separate element attached thereto as illustrated in this embodiment. With the illustrated arrangement, the stop bars 44, hinge pins 26 and flapper elements 22, 24 are assembled to the mounting post 26 as a preliminary operation, that assembly then being mounted to the valve housing 4 by means of the fasteners 52.

The check valve 2 of the disclosure in its various embodiments has a number of advantages. Firstly, as described above, the check valve 2 may avoid total failure in view of the increased number of openings. This improves the reliability of the check valve 2 since in the case of flapper element 22, 24 or hinge pin 28 malfunction, the valve 2 can still continue operation to some extent by virtue of the remaining flapper elements 22, 24. In addition, as the individual flapper elements 22, 24 will be smaller than the traditional semi-circular flapper element, they will be lighter and have a lower moment of inertia meaning they may open more quickly than traditional check valves. Also, the construction is a relatively simple one. The area of the valve opening 6 which is blocked by the radial arms 10 and cross arm 16 is also relatively low such that in some embodiments, the open area of the valve may be up to or over 80% of the total valve area.

As discussed above, the described embodiment is merely exemplary and the skilled person will understand that modifications may be made to the embodiments described without departing from the scope of the disclosure. Some of these modifications have been discussed above. However other modifications are possible.

For example, in some embodiments, the stop bars 44 may be replaced by other stops. For example stops may be provided on the mounting posts 26 which engage with the primary and secondary flappers 22, 24 in their open position. In other embodiments, bumpers may be provided on the flapper elements 22, 24 themselves for engagement with the associated flapper element 22, 24. In addition, the stop bar 44 may have a different form to that illustrated.

All such modifications are intended to fall within the scope of the disclosure.

The invention claimed is:

1. A check valve comprising:
an annular housing defining a generally circular opening;
a plurality of radially extending arms extending across the circular opening from the centre of the valve housing to respective nodes at the periphery of the valve housing;
a plurality of cross arms extending between circumferentially adjacent nodes, thereby dividing the circular opening into a plurality of primary, generally triangular radially inner openings and a plurality of secondary, generally segment shaped radially outer openings;
a plurality of primary, generally triangular flapper elements for closing the primary openings;
a plurality of secondary, generally segment shaped flapper elements for closing the secondary openings
a plurality of mounting posts, a respective mounting post being arranged at a respective node; and
a plurality of hinge pins, each hinge pin being mounted between two circumferentially adjacent mounting posts; wherein
a primary flapper element and a secondary flapper element are hingedly mounted to each hinge pin for pivoting between a closed position in which they close their respective primary and secondary openings and an open position in which they permit flow through their respective primary and secondary openings.

2. The check valve as claimed in claim 1, comprising four primary and secondary openings and four primary and secondary flapper elements.

3. The check valve as claimed in claim 1, wherein the primary flapper elements are each symmetrical about a radial centreline (A) thereof.

4. The check valve as claimed in claim 1, wherein the base end of a primary flapper element comprises a pair of mounting lugs for receiving an associated hinge pin.

5. The check valve as claimed in claim 4, wherein the primary flapper element mounting lugs are arranged at opposed edges of the primary flapper element.

6. The check valve as claimed in claim 1, wherein the secondary flapper elements are each symmetrical about a centreline (A) of each secondary flapper element.

7. The check valve as claimed in claim 6, wherein the base end of a secondary flapper element comprises a pair of mounting lugs for receiving an associated hinge pin.

8. The check valve as claimed in claim 7, wherein the secondary flapper element mounting lugs are arranged displaced inwardly from opposed sides of the secondary flapper element.

9. The check valve as claimed in claim 1, further comprising a plurality of stops for stopping the primary and secondary flapper elements in their open positions.

10. The check valve as claimed in claim 9, wherein the stops comprise respective stop bars extending between respective circumferentially adjacent mounting posts.

11. The check valve as claimed in claim 10, wherein the stop bars are arranged vertically above the hinge pins.

12. The check valve as claimed in claim 10, wherein the mounting posts are formed with bores for receiving the respective stop bars.

13. The check valve as claimed in claim 10, wherein the mounting posts are formed with bores for receiving the respective stop bars.

14. The check valve as claimed in claim 13, wherein the bores are blind bores.

15. The check valve as claimed in claim 1, wherein the mounting posts are separate from the valve housing and mounted thereto by one or more fasteners.

16. The check valve as claimed in claim 15, wherein the mounting posts are formed with bores for receiving respective stop bars.

17. The check valve as claimed in claim 1, wherein the mounting posts are formed with bores for receiving the respective hinge pins.

18. The check valve as claimed in claim 17, wherein the bores are blind bores.

* * * * *